United States Patent [19]
Yen

[11] Patent Number: 5,863,426
[45] Date of Patent: Jan. 26, 1999

[54] AQUARIUM FILTER DEVICE

[76] Inventor: Li-Chen Yen, 58, Ma Yuan West St., Taichung, Taiwan

[21] Appl. No.: 911,112

[22] Filed: Aug. 14, 1997

[51] Int. Cl.$^6$ ..................................................... A01K 63/04
[52] U.S. Cl. ........................................... 210/169; 210/232
[58] Field of Search .................................... 210/150, 169, 210/232, 416.2

[56] References Cited

U.S. PATENT DOCUMENTS

| | | | |
|---|---|---|---|
| 3,816,026 | 6/1974 | Isaacson et al. | 210/169 |
| 3,947,362 | 3/1976 | Etani | 210/416.2 |
| 5,203,990 | 4/1993 | Gargiulo | 210/169 |
| 5,419,831 | 5/1995 | Fuerst et al. | 210/151 |

Primary Examiner—Jay H. Woo
Assistant Examiner—Betsey J. Morrison

[57] ABSTRACT

An aquarium filter device has a base seat, an air bubble producing device, a hollow lower casing, a hollow lower cylinder, a hollow upper cylinder, and a top disk. The base seat has an upper ring, a center hole, a tube, a pipe, and a vent passage. The air bubble producing device has a lower rod inserted in the tube. The hollow lower casing has an upper annular flange, a through hole, and an annular insertion groove. The hollow lower cylinder has a first opening, a plurality of first annular plates, a plurality of first ribs connected to the first annular plates, and an insertion end on a bottom of the hollow lower cylinder inserted in the through hole. The hollow upper cylinder has a second opening, a plurality of second annular plates, a plurality of second ribs connected to the second annular plates, and an insertion end on a bottom of the hollow upper cylinder inserted in the first opening. The top disk has a hollow center sleeve inserted in the second opening. A sponge housing encloses the hollow lower cylinder and the hollow upper cylinder.

2 Claims, 4 Drawing Sheets

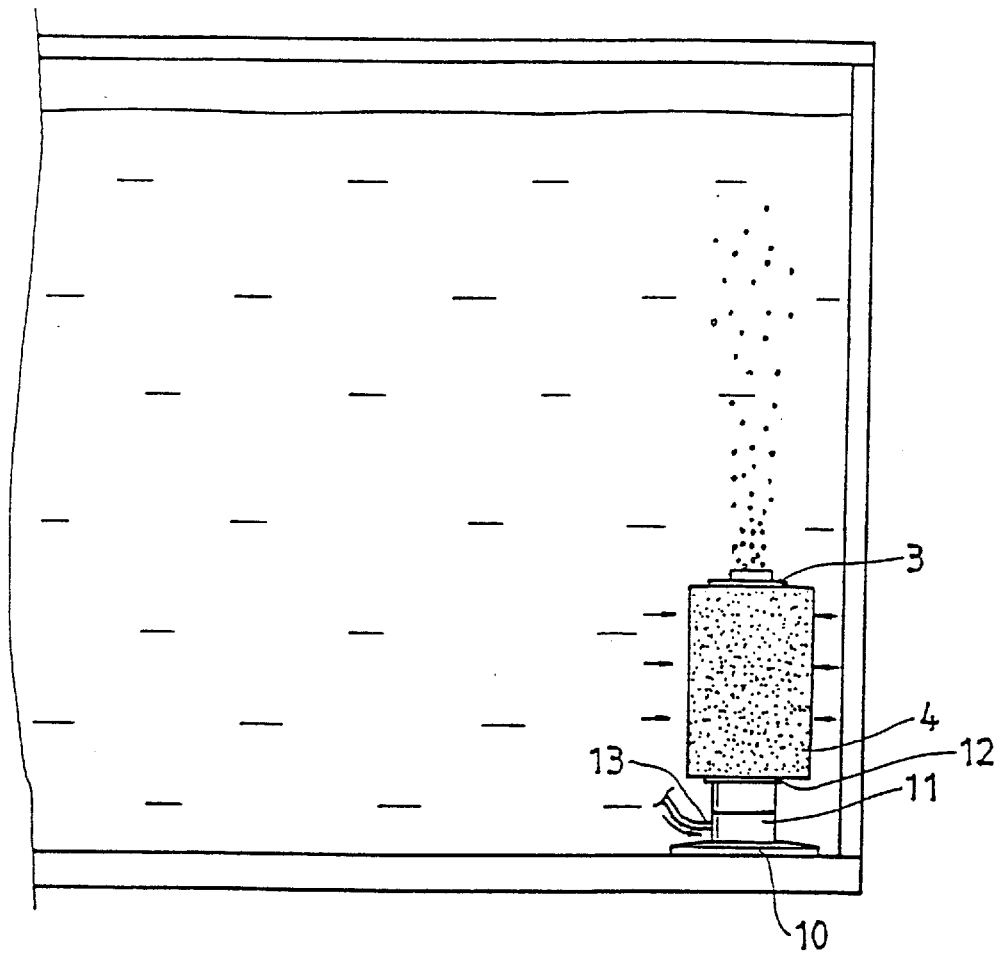
F I G. 4

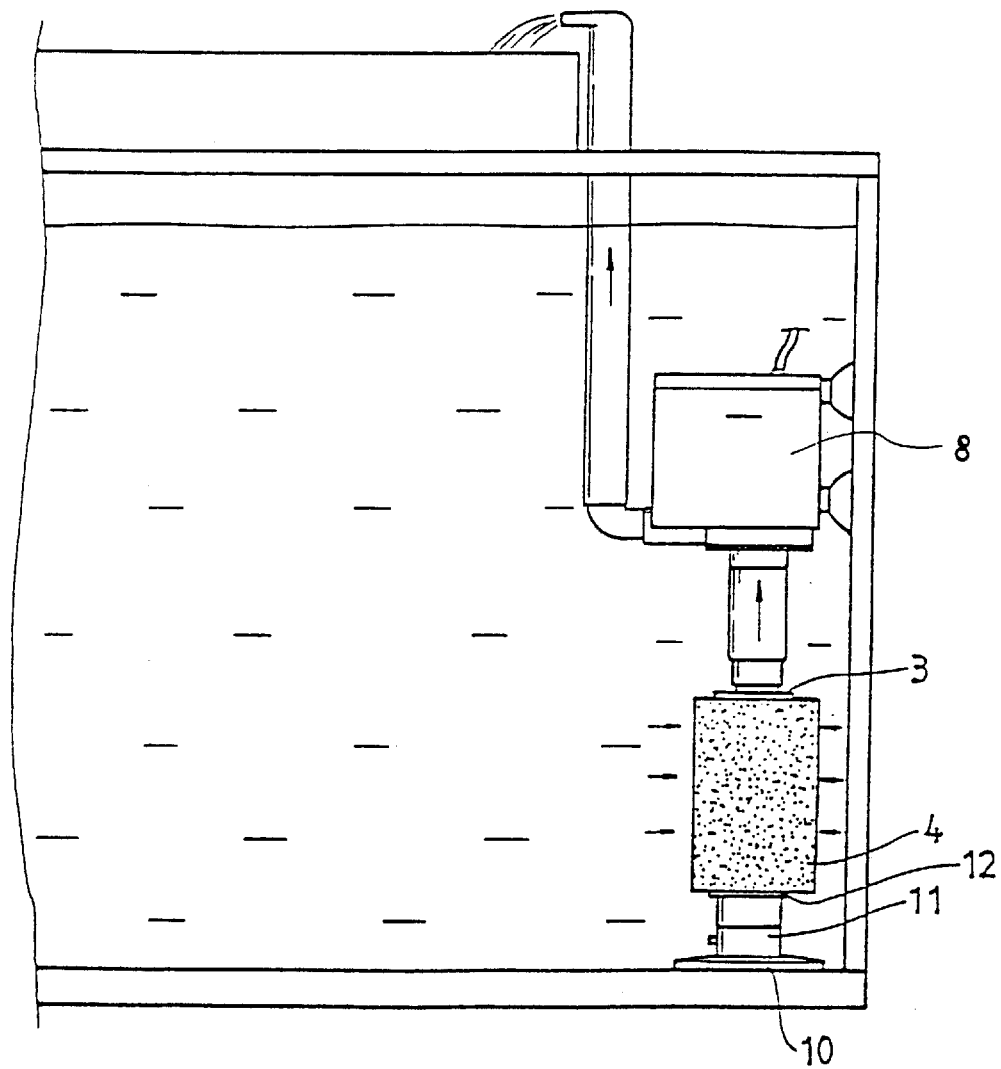
F I G. 5

AQUARIUM FILTER DEVICE

BACKGROUND OF THE INVENTION

The present invention relates to an aquarium filter device. More particularly, the present invention relates to an aquarium filter device which can receive a large number of beneficial microbes.

A conventional aquarium filter device comprises an air bubble producing device in an interior of the conventional aquarium filter device. However, the air bubble producing device is easily blocked by beneficial microbes. Furthermore, the interior of the conventional aquarium filter device is very small so that the beneficial microbes cannot propagate with extreme rapidity.

SUMMARY OF THE INVENTION

An object of the present invention is to provide an aquarium filter device which can receive a large number of beneficial microbes.

Another object of the present invention is to provide an aquarium filter device which can replace an air bubble producing device easily.

Accordingly, an aquarium filter device comprises a base seat, an air bubble producing device, a hollow lower casing, a hollow lower cylinder, a hollow upper cylinder, and a top disk. The base seat has an upper ring defining a center hole, a tube, a pipe communicating with the tube, and a vent passage formed in the pipe. The air bubble producing device has a lower rod inserted in the tube. The hollow lower casing has an upper annular flange, a through hole, and an annular insertion groove formed on a bottom of the hollow lower casing to receive the upper ring. The hollow lower cylinder has a first opening, a plurality of first annular plates, a plurality of first ribs connected to the first annular plates, and an insertion end on a bottom of the hollow lower cylinder inserted in the through hole. The hollow upper cylinder has a second opening, a plurality of second annular plates, a plurality of second ribs connected to the second annular plates, and an insertion end on a bottom of the hollow upper cylinder inserted in the first opening. The top disk has a hollow center sleeve inserted in the second opening. A sponge housing encloses the hollow lower cylinder and the hollow upper cylinder. The sponge housing is disposed between the hollow lower casing and the top disk.

BRIEF DESCRIPTION OF THE DRAWINGS

FIG. 4 is a schematic view illustrating an application of an aquarium filter device of a preferred embodiment in accordance with the present invention; and FIG. 5 is a schematic view illustrating another application of an aquarium filter device of a preferred embodiment in accordance with the present invention.

DETAILED DESCRIPTION OF THE INVENTION

Figure 1:
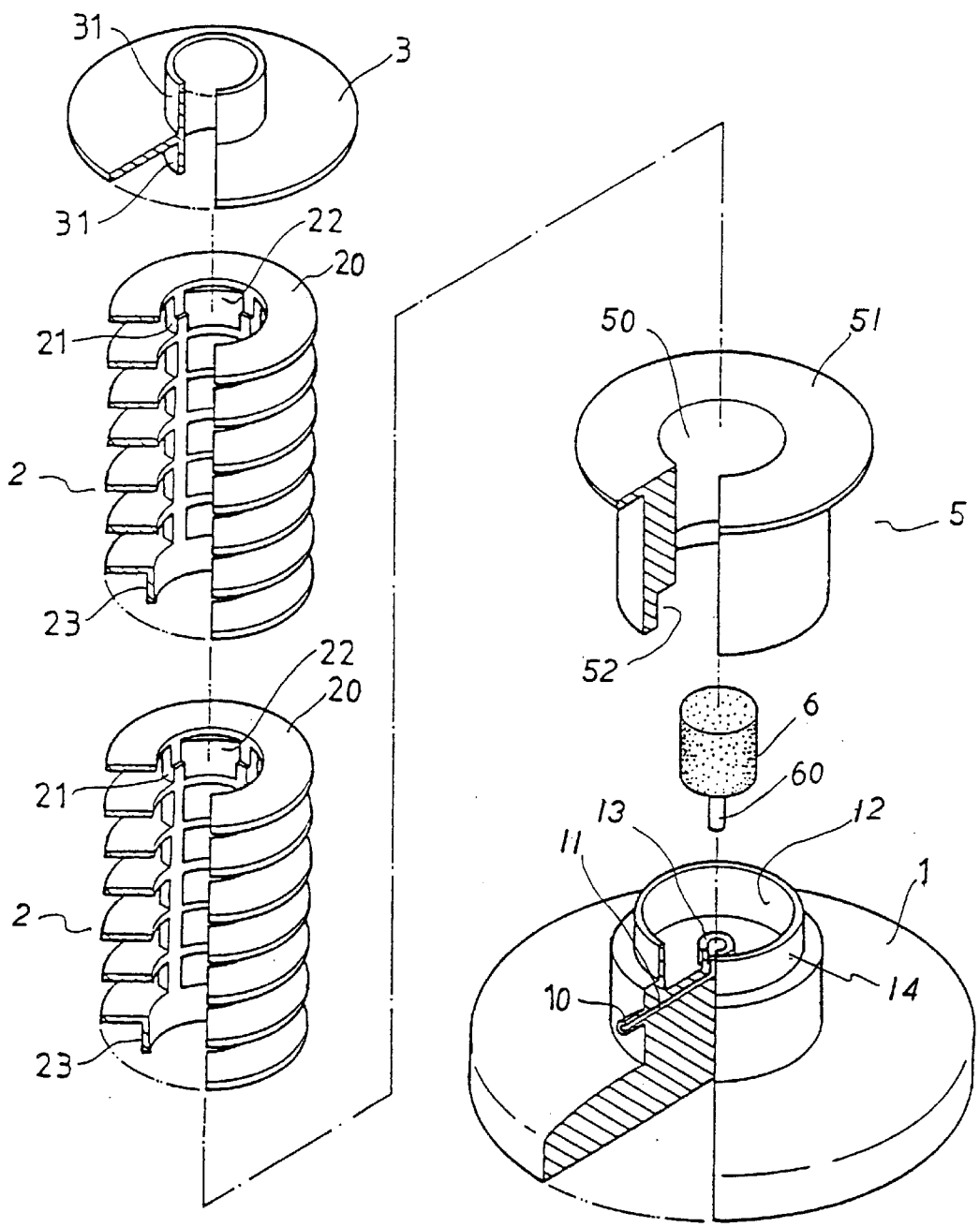
FIG. 1 is a perspective exploded view of an aquarium filter device of a preferred embodiment in accordance with the present invention.
Figure 3:
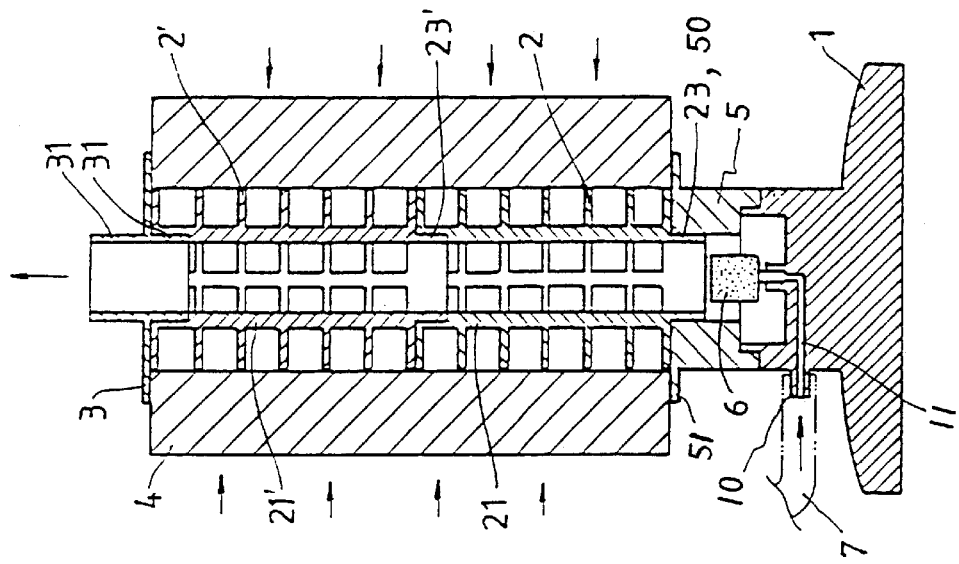
FIG. 3 is a sectional view taken along line 3A—3A in FIG. 2.
Figure 2:
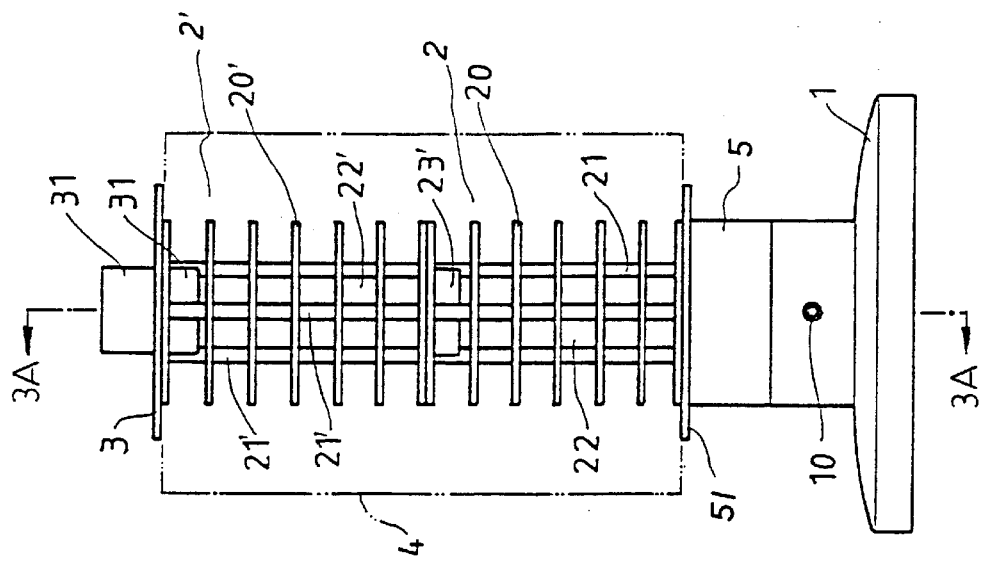
FIG. 2 is an elevational view of FIG. 1.

Referring to FIGS. 1 to 3, an aquarium filter device comprises a base seat 1, an air bubble producing device 6, a hollow lower casing 5, a hollow lower cylinder 2, a hollow upper cylinder 2', and a top disk 3. The base seat 1 has an upper ring 14 defining a center hole 12, a tube 13, a pipe 10 communicating with the tube 13, and a vent passage 11 formed in the pipe 10. The air bubble producing device 6 has a lower rod 60 inserted in the tube 13. The hollow lower casing 5 has an upper annular flange 51, a through hole 50, and an annular insertion groove 52 formed on a bottom of the hollow lower casing 5 to receive the upper ring 14. The hollow lower cylinder 2 has a first opening 22, a plurality of first annular plates 20, a plurality of first ribs 21 connected to the first annular plates 20, and an insertion end 23 on a bottom of the hollow lower cylinder 2 inserted in the through hole 50. The hollow upper cylinder 2' has a second opening 22', a plurality of second annular plates 20', a plurality of second ribs 21' connected to the second annular plates 20', and an insertion end 23' on a bottom of the hollow upper cylinder 2' inserted in the first opening 22'. The top disk 3 has a hollow center sleeve 31 inserted in the second opening 22'. A sponge housing 4 encloses the hollow lower cylinder 2 and the hollow upper cylinder 2'. The sponge housing 4 is disposed between the hollow lower casing 5 and the top disk 3.

Referring to FIG. 4, the aquarium filter device is placed in an aquarium. The air bubble producing device 6 can produce air bubbles to facilitate the propagation of the beneficial microbes.

Referring to FIG. 5, the aquarium filter device is placed in an aquarium. A pump device 8 is connected to the aquarium filter device.

The invention is not limited to the above embodiment but various modification thereof may be made. Further, various changes in form and detail may be made without departing from the scope of the invention.

I claim:

1. An-aquarium filter device comprises:

a base seat, an air bubble producing device, a hollow lower casing, a hollow lower cylinder, a hollow upper cylinder, and a top disk, the base seat having an upper ring defining a center hole, a tube, a pipe communicating with the tube, and a vent passage formed in the pipe, the air bubble producing device having a lower rod inserted in the tube, the hollow lower casing having an upper annular flange, a through hole, and an annular insertion groove formed on a bottom of the hollow lower casing to receive the upper ring, the hollow lower cylinder having a first opening, a plurality of first annular plates, a plurality of first ribs connected to the first annular plates, and an insertion end on a bottom of the hollow lower cylinder inserted in the through hole, the hollow upper cylinder having a second opening, a plurality of second annular plates, a plurality of second ribs connected to the second annular plates, and an insertion end on a bottom of the hollow upper cylinder inserted in the first opening, and the top disk having a hollow center sleeve inserted in the second opening.

2. An aquarium filter device as claimed in claim 1, wherein a sponge housing encloses the hollow lower cylinder and the hollow upper cylinder and the sponge housing is disposed between the hollow lower casing and the top disk.

* * * * *